3,347,616
PHOTOMETRIC COMB MINIMIZING PHOTOMETRIC ERRORS ARISING FROM NON-UNIFORMITY OF ILLUMINATION
Leo Mori, Tokyo, Hideo Osawa, Yokohama, and Ichiro Fujita, Tokyo, Japan, assignors to Tokyo Shibaura Electric Co., Ltd., Kawasaki-shi, Japan, a corporation of Japan
Filed May 23, 1963, Ser. No. 282,789
Claims priority, application Japan, May 28, 1962, 37/21,075
1 Claim. (Cl. 350—271)

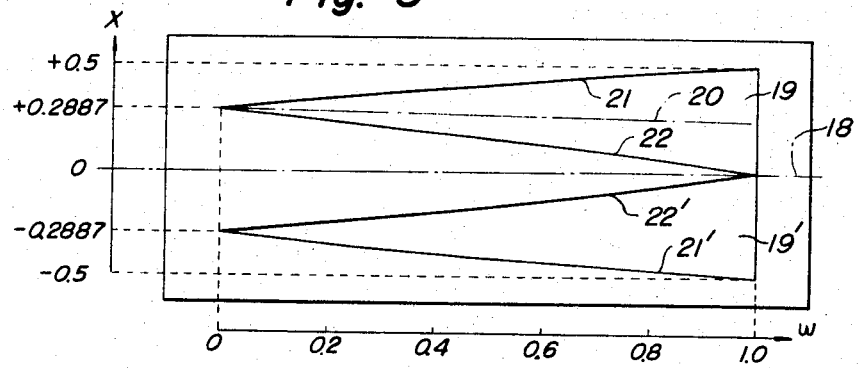
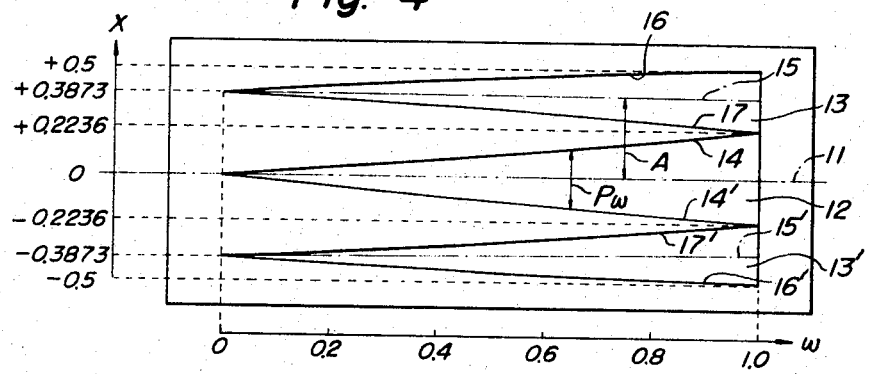
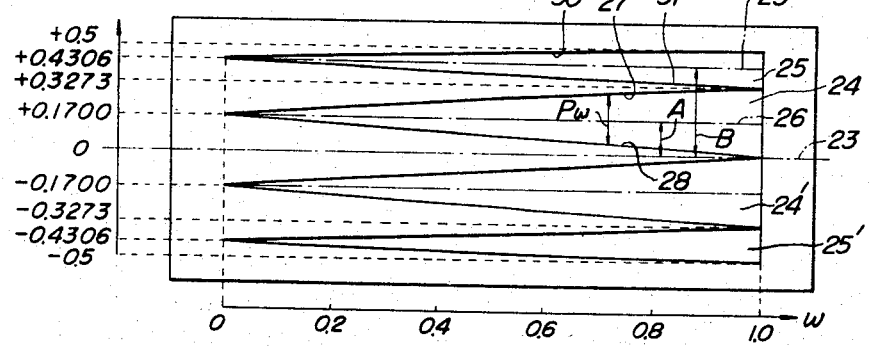

The present invention relates to an improved photometric comb used as an optical attenuator.

In various photometric apparatus utilizing photometric balance, photometric combs (or optical combs) have often been employed as optical attenuator elements for providing photometric balance. The reason for this fact is that the photometric comb is advantageous in that it has no spectral selectivity, and a comb in which the distance of its insertion into a light beam and its radiant transmittance are in linear relation to each other is easily manufactured. Accordingly, it has been especially utilized in recording spectrophotometers for the infrared region and in recording spectrophotometers for the visible spectrum, and in other photometric instruments. The photometric comb, however, requires a cross section of light beam to take the form of a fairly narrow straight line at a location where the comb is to be inserted with a highly uniform distribution of radiant flux over the straight line. But it is exceedingly difficult that the requirement of uniformity of radiant flux be fully satisfied practically, and this is the reason why utilization of the photometric comb has been limited.

It is an object of the present invention to provide a photometric comb which minimizes photometric error due to nonuniformity of illumination. This and other objects and advantages of the invention will be apparent after a perusal of the following specification taken in conjunction with the accompanying drawings wherein:

FIGS. 3 to 5 show plan views of improved photometric combs according to the present invention, having respectively two, three and four windows each in the form of a curvilinear triangle;

Figure 1:
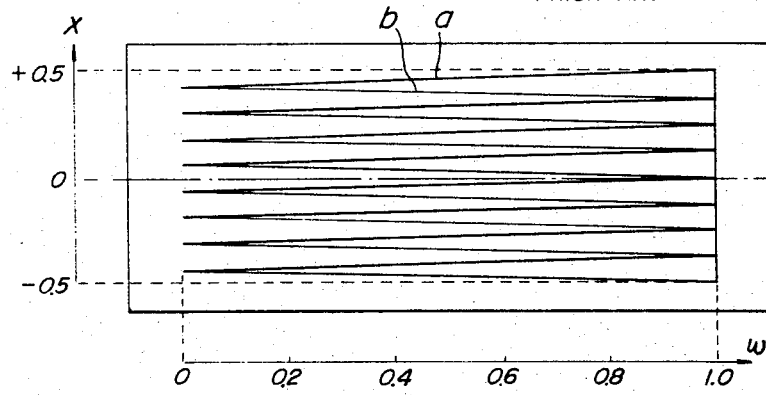
FIGS. 1 and 2 show plan views of conventional photometric combs.

The windows of the conventional photometric comb, for example, take the form of an isosceles triangle with two sides $a$ and $b$ being equal and rectilinear as shown in FIG. 1 and in general the number of the windows has been increased from, for instance, five to as many as ten. On the other hand, unless the width of the window of the comb is sufficiently large compared with wave length of light, the advantage of nonselectivity and linearity of the comb is lost owing to diffraction phenomena. These objections become serious as the number of the windows increases, and at the same time manufacturing difficulties become greater, particularly in a region of small transmission. In order to obviate said shortcomings a photometric comb having reduced number of windows and an increased inclination of the sides in the region of small transmission has been practically employed. Even with these expedients, if the number of windows is increased to reduce the error due to nonuniformity of radiant flux distribution, complexity of structure and hence manufacturing difficulty increases, at the same time mechanical strength of the instrument is reduced, and effectively mechanical precision deteriorates. The result of numerical investigation will now be described as for error due to nonuniformity of illumination, assuming that a photometric comb having windows of the conventional isosceles triangle type is made ideally. Taking the direction of linear illumination which is normal to the longitudinal direction of the comb as x-direction, and making the effective breadth of the comb to be $1(x=-0.5\sim+0.5)$, it is assumed that in this range distribution function $F(x)$ in the longitudinal direction of radiant flux of the illumination having a rectilinear section is expressed by the following power expansion of $x$, $$F(x)=a_0+a_1x+a_2x^2+a_3x^3+a_4x^4+a_5x^5+\ldots \quad (1)$$

Although for perfect uniform distribution $$a_1=a_2=a_3=\ldots=0$$

it is very difficult to realize such state. Practically the higher power coefficients can be made sufficiently small by adequately designing the optical system, but the low power coefficients will have finite values.

If the distance between the edge of the window and the illuminated position of the comb is $w(0\leq w\leq 1.0)$ and if the total length of the window is taken as 1.0, then deviation E of transmitted light from linearity in a photometric comb having $n$ isosceles type windows can be obtained by the following formula;

$$E=\sum_{i=1}^{n}\int_{\frac{2i-n-1-w}{2n}}^{\frac{2i-n-1+w}{2n}}F(x)dx - w\int_{-0.5}^{+0.5}F(x)dx=$$

$$\frac{a_2w}{3\cdot 2^2\cdot n^2}(w-1)+\frac{a_4w}{5\cdot 2^4 n^4}\left\{w^4+\frac{10w^2}{3}(n^2-1)-\frac{1}{3}(10n^2-7)\right\}+\cdots$$

(2)

It is apparent from Formula 2 that error arises from the terms of even power but not from those of odd power of the distribution function. From calculation, maximum error appears in the vicinity of $w=0.6$ and may be evaluated as follows:

For $n=2$: $E_2\max \doteq -8\times 10^{-3}a_2-4\times 10^{-3}a_4$
For $n=4$: $E_4\max \doteq -2\times 10^{-3}a_2-1\times 10^{-3}a_4$
For $n=6$: $E_6\max \doteq -9\times 10^{-4}a_2-5\times 10^{-4}a_4$
For $n=8$: $E_8\max \doteq -5\times 10^{-4}a_2-3\times 10^{-4}a_4$ Heretofore calculation was made only for combs each having an even number of windows but it is evident that the values for these having an odd number of windows fall between those for even numbers. Thus, more than eight windows are needed to suppress the error due to nonuniformity of illumination below 0.1 percent of each of the coefficients ($a_2$, $a_4$) of the terms of the second and fourth power of the distribution function for isosceles triangle type photometric combs.

As described above, in conventional photometric combs having windows in the form of an isosceles triangle, the number of windows had to be so increased in order to reduce photometric error that they became difficult to manufacture.

It is an object of the present invention to minimize photometric error due to nonuniformity of illumination by means of a photometric comb which satisfies the three conditions enumerated below, where the illumination has a rectilinear cross section and is of a distribution function represented by the above Equation 1, and which is provided with two or more light passing windows.

(I) The widths of the windows are selected so that their total sum at any position is linearly proportional to the distance from that position to the point (apex) where the windows vanish.

(II) The shape of the photometric comb is kept in symmetry with respect to the longitudinal axis of the photometric comb.

(III) Each of the windows takes the form of a triangle two sides of which are curvilinear such that photometric error arising from the terms of the lower even power of Equation 1 is eliminated, or takes the form of a scalene rectilinear triangle which approximate to said curvilinear triangle (hereinafter referred to as an approximate rectilinear triangle).

Here, condition I is acquired to eliminate the photometric error arising from the term of zeroth power, $a_0$, in the distribution function of the illumination represented by Equation 1 and is satisfied by the conventional photometric comb, too. Condition II is required to eliminate photometric error arising from the odd power terms in Equation 1, and is also satisfied by the conventional photometric comb having windows in the form of an isosceles triangle. Condition III is proposed according to the present invention and enables the minimizing of photometric error.

Since, for a photometric comb having one window in the present invention, the shape of the window is obliged to be an isosceles triangle, symmetric with respect to its centre line, according to conditions I and II the degree of freedom to condition III becomes zero and the object of the invention cannot be accomplished. Accordingly, the case of one window falls out of the scope of the present invention. Practically, a photometric comb having only one window is used only in the case that either uniformity of distribution of illumination is ideally realized or photometric accuracy is of little importance.

When there are two windows, although the width of each window is definite according to conditions I and II, the relation between the center line of each window and the axis of the comb leaves one degree of freedom to condition III. Therefore the form of the comb which can cause the error arising from the quadratic term $a_2x^2$ in Equation 1 to vanish can be determined. Since error arising from all odd power terms is zero according to condition II, a photometric comb without error arising from all terms, as far as the cubic term can be constructed. When there are three windows, there exists a limitation that the centre line of the central window must coincide with the axis of the comb and the shapes of the two side windows must be symmetric and congruent. Thus, the breadths of the side windows are determined uniquely according to condition I. But the breadth of the central window and the position of either of the side windows yet remain undetermined as degrees of freedom to condition III. Thus the shape of the comb which causes the errors arising from the second and fourth power terms, $a_2x^2$ and $a_4x^4$, respectively in Equation 1 to vanish can be determined and, at the same time, the error arising from all terms as far as the fifth power term vanishes.

Similarly, in a comb having four windows, the degree of freedom to condition III is three and the error arising from all terms as far as the seventh power term can be caused to vanish. When there are $n$ windows in general, degree of freedom to condition III becomes $n-1$ and a photometric comb can be designed in which the error arising from all terms as far as the $(2n-1)$th power term may be caused to vanish. Thus, the present invention proves to be of high quality beyond the error Equation 2, and its numerical values, for conventional photometric combs having windows, each in the form of an isosceles triangle.

The above-mentioned photometric comb is ideal from the point of view that conditions I and II as well as condition III are satisfied and the photometric error arising from the lower power terms is caused to vanish. The form of both sides for attenuating light flux of an ideal photometric comb is a curve of slight curvature as will be later illustrated. Although it is possible to manufacture a photometric comb having windows which include two sides with curvature to this extent, it is more difficult than to manufacture one having rectilinear sides. Thus a rectilinear photometric comb is made which can be easily manufactured by substituting a scalene rectilinear triangle, approximating a curvilinear triangle, and for said curvilinear triangle photometric error arising from the of lower power terms may be minimized. Even a rectilinear photometric comb, for instance, having three scalene triangle windows is comparable in quality to a conventional photometric comb having eight windows each in the form of an isosceles triangle.

A photometric comb having three windows will now be described in conjunction with FIG. 4.

Figure 6:
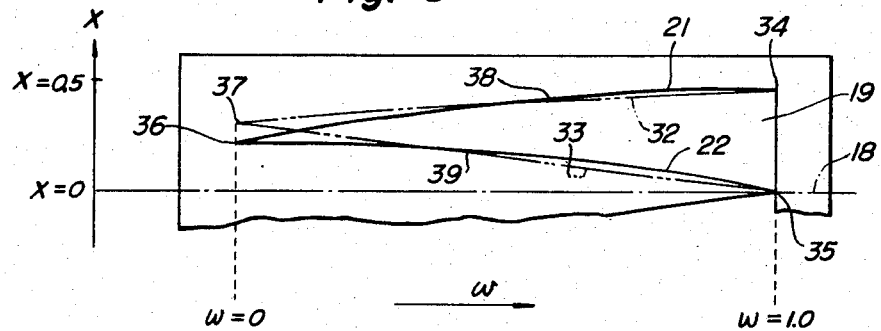
FIG. 6 shows a plan view illustrating an example having windows in the form of a scalene triangle which approximates the curvilinear one.

As shown in FIGURE 6, the $w$-axis is taken along the length of the windows and $x$-axis along their breadth. The centre line of the central window 12 i.e. the axis of the comb is denoted by numeral 11. Distance between curvilinear sides 14, 14' of the central window is taken as $Pw$ and hence distance between the center line 11 and either of the sides 14, 14' is $Pw/2$. Height of the center line 15 of one of side windows 13 from the center line 11 is denoted by A. According to conditions I and II, heights of sides 16 and 17 of one of the side windows 13 from the center line 11 will be $A+(1-P)w/4$ and $A-(1-P)w/4$, respectively, and heights of sides 16' and 17' of the other of the side windows 13' from the center line 11 will be $-A-(1-P)w/4$ and $-A+(1-P)w/4$, respectively. Moreover, heights of the sides 14 and 14' of the central window 12 from the axis 11 will be $+Pw/2$ and $-Pw/2$, respectively. Here A and P are both considered to be functions of $w$ and it is contemplated to obtain a photometric comb providing minimized photometric error by properly determining their functional forms.

When the above-mentioned photometric comb is inserted into a flux of illumination having a flux distribution of a rectilinear cross section, radiant transmittance $P_3$ is represented by the following formula:

$$T_3 = \left\{ \int_{-A+\frac{(1-P)w}{4}}^{-A+\frac{(1-P)w}{4}} F(x)dx + \int_{-\frac{Pw}{2}}^{\frac{Pw}{2}} F(x)dx + \int_{A-\frac{(1-P)w}{4}}^{A+\frac{(1-P)w}{4}} F(x)dx \right\} \bigg/ \int_{-0.5}^{0.5} F(x)dx =$$

$$\left[ wa_0 + \frac{a_2 w}{3}\left[ 3A^2(1-P) + w^2\left\{\frac{P^3}{2^2} + \frac{(1-P)^3}{4^2}\right\}\right] + \frac{a_4 w}{5}\left[ 5A^4(1-P) + \frac{10}{2^4}A^2w^2(1-P)^3 + w^2\left\{\frac{P^5}{2^4} + \frac{(1-P)^5}{4^4}\right\}\right] + \cdots \right] \bigg/ \left\{ a_0 + \frac{a_2}{3\cdot 2^2} + \frac{a_4}{5\cdot 2^2} + \frac{a_5}{7\cdot 2^6} + \cdots \right\} \quad (3)$$

Since such a photometric comb having three windows has two degrees of freedom, A and P, neglecting the coefficients beyond $a_6$ in Formula 3, $T_3$, which is always proportional exactly to $w$, is obtained by so determining A and P that the following simultaneous equations are satisfied, irrespective of $a_0$, $a_2$, $a_4$ and $w$.

$$2^2\left[ 3A^2(1-P) + w^2\left\{\frac{P^3}{2} + \frac{(1-P)^3}{4^2}\right\}\right] = 1$$

$$2^4\left[ 5A^4(1-P) + \frac{10}{2^4}A^2w^2(1-P)^3 + w^4\left\{\frac{P^5}{2^4} + \frac{(1-P)^5}{4^4}\right\}\right] = 1 \quad (4)$$

In Table 2 and FIG. 4, there is shown a result of the determination of the forms of the sides by means of A and P obtained by solving Equations 4. It is easily seen from the above-mentioned solving method that in an ideal photometric comb having three windows there arises no error from all terms as far as the fifth power term in Equation 1 of the distribution function of radiant flux. Calculated maximum error due to the sixth power term is given by $$E_3 \max \doteq -1.2 \cdot 10^{-4} a_6 \quad (5)$$

Thus the ideal photometric comb having three windows according to the present invention is comparable in accuracy to conventional combs having more than ten windows.

In Table 2, the heights of the side 14 of the window 12 and the sides 16, 17 of the window 13 from the axis 11 are written as functions of the length $w$ of the windows, taking the maximum breadth as 1.0, and as for the sides 14', 16' and 17' numerical results are not written as they are symmetric with the sides 14, 16 and 17, respectively.

Radiant transmittance $T_2$ for a photometric comb having two windows can be obtained by taking P=0 in Equation 3. Degree of freedom in this case is only one, A, and a photometric comb without error arising from all terms as far as the third power can be obtained, by taking $A=\sqrt{12-3w^2}/12$ so that $$12A^2 + w^2/4 = 1 \quad (6)$$

may be satisfied. The result thereof is shown in FIG. 3 and Table 1. Maximum error arising from the fourth power term in this case is $$E_2 \max = -1.97 \cdot 10^{-3} a_4 \quad (7)$$

and this may be considered comparable to conventional photometric combs having five windows.

In Table 1, heights of sides 20, 21 of a window 19 from the axis 18 is written in Table 2, but since a window 19' is symmetric with the window 19, entry is not made for sides 20', 21'.

For a photometric comb having four windows, in FIG. 5, taking breadth between sides 27 and 28 of a window 24 as $Pw$, height of the center line of the window 24 from the axis 23 of the comb as A, and the height of the center line 29 of a window 25 from the axis 23 as B, radiant transmittance $T_4$ is given by $$T_4 = \left\{ \int_{-B-\left(\frac{1}{4}-\frac{P}{2}\right)w}^{-B+\left(\frac{1}{4}-\frac{P}{2}\right)w} F(x)dx + \int_{-A-\frac{Pw}{2}}^{-A+\frac{Pw}{2}} F(x)dx + \int_{A-\frac{Pw}{2}}^{A+\frac{Pw}{2}} F(x)dx + \int_{B-\left(\frac{1}{4}-\frac{P}{2}\right)w}^{B+\left(\frac{1}{4}-\frac{P}{2}\right)w} F(x)dx \right\} \bigg/ \int_{-0.5}^{0.5} F(x)dx \quad (8)$$

In this case there are three degrees of freedom, P, A and B, and the shape of the photometric comb which causes error arising from all terms as far as the seventh power term to vanish can be determined by solving the following simultaneous equations.

$$24\{PA^2 + (\tfrac{1}{2}-P)B^2\} + 2w^2\{P^3 + (\tfrac{1}{2}-P)^3\} = 1$$

$$160\{PA^4 + (\tfrac{1}{2}-P)B^4\} + 80w^2\{P^3A^2 + (\tfrac{1}{2}-P)^3\} + 2w^4\{P^5 + (\tfrac{1}{2}-P)^5\} = 1 \quad (9)$$

$$896\{PA^6 + (\tfrac{1}{2}-P)B^6\} + 1120w^2\{P^3A^4 + (\tfrac{1}{2}-P)^3B^4\} + 168w^4\{P^5A^2 + (\tfrac{1}{2}-P)^5B^2\} + 2w^6\{P^7 + (\tfrac{1}{2}-P)^7\} = 1$$

FIG. 5 and Table 3 indicate the shape of an ideal photometric comb having four windows determined by solving Equations 9. In Table 3 also, height of each side from the axis 23 of the comb is written as a function of the length $w$ from zero point, and entry is not made as for windows 24', 25' which are symmetric with 24, 25.

TABLE 1

| Length from 0-point | Height from the axis 18 of the comb in Fig. 3 | |
|---|---|---|
| w | Side 21 | Side 22 |
| 0.00 | 0.2887 | 0.2887 |
| 0.05 | 0.3011 | 0.2761 |
| 0.10 | 0.3133 | 0.2633 |
| 0.15 | 0.3254 | 0.2504 |
| 0.20 | 0.3372 | 0.2372 |
| 0.25 | 0.3489 | 0.2239 |
| 0.30 | 0.3604 | 0.2104 |
| 0.35 | 0.3717 | 0.1967 |
| 0.40 | 0.3828 | 0.1828 |
| 0.45 | 0.3938 | 0.1687 |
| 0.50 | 0.4045 | 0.1545 |
| 0.55 | 0.4150 | 0.1400 |
| 0.60 | 0.4254 | 0.1254 |
| 0.65 | 0.4355 | 0.1105 |
| 0.70 | 0.4454 | 0.0954 |
| 0.75 | 0.4551 | 0.0801 |
| 0.80 | 0.4646 | 0.0646 |
| 0.85 | 0.4738 | 0.0488 |
| 0.90 | 0.4828 | 0.0328 |
| 0.95 | 0.4915 | 0.0165 |
| 1.00 | 0.5000 | 0.0000 |

TABLE 2

| Length from 0-point | Height from the axis 11 of the comb in Fig. 4 | | |
|---|---|---|---|
| w | Side 15 | Side 17 | Side 14 |
| 0.00 | 0.3873 | 0.3873 | 0.0000 |
| 0.05 | 0.3942 | 0.3803 | 0.0111 |
| 0.10 | 0.4009 | 0.3732 | 0.0222 |
| 0.15 | 0.4076 | 0.3659 | 0.0333 |
| 0.20 | 0.4141 | 0.3585 | 0.0445 |
| 0.25 | 0.4205 | 0.3511 | 0.0556 |
| 0.30 | 0.4267 | 0.3434 | 0.0667 |
| 0.35 | 0.4329 | 0.3357 | 0.0778 |
| 0.40 | 0.4389 | 0.3278 | 0.0890 |
| 0.45 | 0.4447 | 0.3199 | 0.1001 |
| 0.50 | 0.4505 | 0.3118 | 0.1113 |
| 0.55 | 0.4561 | 0.3035 | 0.1224 |
| 0.60 | 0.4616 | 0.2952 | 0.1336 |
| 0.65 | 0.4669 | 0.2867 | 0.1448 |
| 0.70 | 0.4721 | 0.2781 | 0.1560 |
| 0.75 | 0.4771 | 0.2693 | 0.1672 |
| 0.80 | 0.4820 | 0.2604 | 0.1784 |
| 0.85 | 0.4867 | 0.2514 | 0.1897 |
| 0.90 | 0.4913 | 0.2423 | 0.2010 |
| 0.95 | 0.4957 | 0.2330 | 0.2123 |
| 1.00 | 0.5000 | 0.2236 | 0.2236 |

TABLE 3

| Length from 0-point | Height from the axis 23 of the comb in Fig. 5 | | | |
|---|---|---|---|---|
| w | Side 30 | Side 31 | Side 27 | Side 28 |
| 0.00 | 0.4306 | 0.4306 | 0.1700 | 0.1700 |
| 0.05 | 0.4349 | 0.4262 | 0.1781 | 0.1618 |
| 0.10 | 0.4391 | 0.4217 | 0.1862 | 0.1536 |
| 0.15 | 0.4432 | 0.4172 | 0.1943 | 0.1454 |
| 0.20 | 0.4473 | 0.4215 | 0.2024 | 0.1371 |
| 0.25 | 0.4513 | 0.4078 | 0.2104 | 0.1288 |
| 0.30 | 0.4552 | 0.4030 | 0.2183 | 0.1205 |
| 0.35 | 0.4590 | 0.3981 | 0.2263 | 0.1121 |
| 0.40 | 0.4627 | 0.3932 | 0.2342 | 0.1037 |
| 0.45 | 0.4663 | 0.3881 | 0.2421 | 0.0953 |
| 0.50 | 0.4698 | 0.3830 | 0.2500 | 0.0868 |
| 0.55 | 0.4733 | 0.3778 | 0.2578 | 0.0783 |
| 0.60 | 0.4767 | 0.3725 | 0.2657 | 0.0698 |
| 0.65 | 0.4799 | 0.3672 | 0.2734 | 0.0612 |
| 0.70 | 0.4831 | 0.3617 | 0.2812 | 0.0526 |
| 0.75 | 0.4862 | 0.3562 | 0.2890 | 0.0439 |
| 0.80 | 0.4891 | 0.3506 | 0.2967 | 0.0352 |
| 0.85 | 0.4920 | 0.3449 | 0.3044 | 0.1265 |
| 0.90 | 0.4948 | 0.3391 | 0.3120 | 0.0177 |
| 0.95 | 0.4974 | 0.3333 | 0.3917 | 0.0098 |
| 1.00 | 0.5000 | 0.3273 | 0.3273 | 0.0000 |

The maximum error of the above-mentioned ideal photometric comb having four windows is $$E_4 \max. = 7.65 \cdot 10^{-6} a_8 \quad (10)$$

and, therefore, this photometric comb is more accurate than that realizable by the conventional method.

As is apparent from the numerical values described above, the photometric comb according to the present invention having three to four windows can give sufficiently exact results. Furthermore, if necessary, by extending similar consideration, more accurate results will be obtained by increasing the number of windows. For a photometric comb having $n$ windows in general, error arising from the terms as far as the $(2n-1)$th power term can be caused to thoroughly vanish. Such an ideal photometric comb can provide equal accuracy using a far smaller number of windows than the conventional one and can be easily manufactured.

Although the form of the sides of the above-mentioned ideal photometric comb is a curve of a small curvature as is apparent from Tables 1 to 3, photometric error resulting from approximation by rectilinear form is small as the curve closely resembles a straight line. Its accuracy is slightly inferior to that of the ideal photometric comb but is far superior to that of the conventional comb having the same number of windows of isosceles triangle type. Therefore, for the same degree of accuracy, the device according to the present invention can be more easily manufactured than the conventional one. The approximate form will now be described.

In FIG. 6, there is shown an example of modifying the curvilinear sides of the ideal photometric comb having two windows into rectilinear sides, wherein the curvature of the curvilinear sides is shown exaggerated.

There exists a condition that when the curvilinear triangle 19 is transformed into a scalene triangle by substituting straight lines 32 and 33 for the curvilinear sides 21 and 22, the open end of a photometric comb must be fully opened. Therefore, the right hand ends (as viewed in FIG. 6) of the lines 32 and 33 must coincide with the right hand ends 34 and 35 of the curvilinear sides 21 and 22, respectively, determination of the lines 32, 33 depends only upon how much their extreme left hand end 37 can be shifted along a line $w=0$ from the left hand end 36 of the curvilinear sides 21 and 22. Because a straight line and a curve can intersect at least at two points, the line 32 and the curve 21 can intersect at any one point 38 other than the point 34 and the line 33 and the curve 22 can intersect at any one point 39 other than the point 35. Consequently, where to locate the point 37 depends on what values of $w$ are selected for the points 38 and 39. When it is known that the photometric comb is to be used principally in the vicinity of a particular value of $w$, a photometric comb having approximate rectilinear windows which makes error small can be attained by locating the points of intersection of the straight lines and the curves near the point of that value of $w$.

On the contrary, when the comb is to be used over a wide range of $w$, the approximate straight lines may be so determined that the maximum value of error becomes as small as possible. In general, when the coefficient $a_2$ of the quadratic term of the distribution function of radiant flux is positive, the portions of the sides 32, 33 of the approximating rectilinear photometric comb which lie on the axis 18 side of the ideal curvilinear sides 21, 22 (on the right side of the points 38, 39 in FIG. 6) yield negative error, and the portions of the sides 32, 33 which lie on the other side of the sides 21, 22 (on the left side of the points 38, 39 in FIG. 6) yield positive error. As a result, if the positions of the points 38, 39 are so selected that maximum error on the right of the points 38, 39 is of equal magnitude and opposite sign to that on the left of those points, an approximate rectilinear photometric comb in which net maximum error as a whole is minimized can be obtained.

Figure 7:
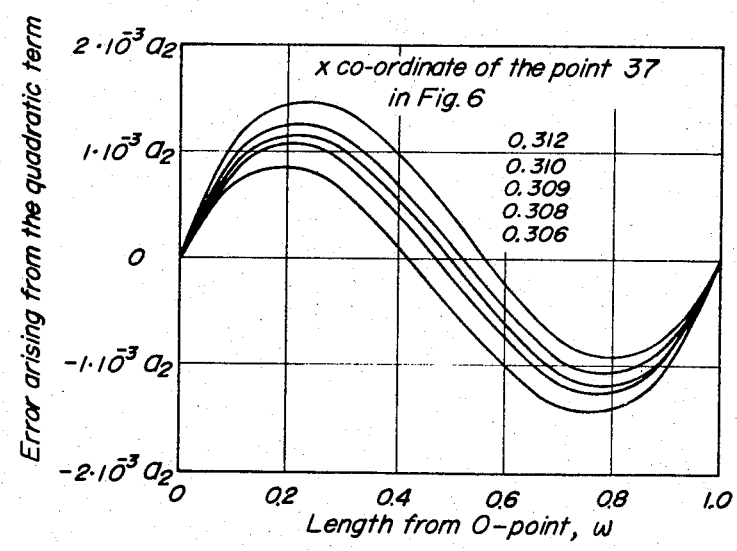
FIG. 7 shows a graph illustrating the error of an approximate rectilinear photometric comb with respect to an ideal one, each having two windows.

In FIG. 7 there is shown a plot of calculated error arising from the quadratic term of the distribution function of radiant flux for several values of $x$-coordinate (height from the axis 18) versus $w$. It will be apparent from the figure that by selecting $x$-coordinate of the point 37 near 0.309 the absolute values of positive and negative errors become nearly equal and an approximate rectilinear photometric comb minimized in net error as a whole may be obtained. Accordingly, for the case of two windows it is best to select the forms of approximate rectilinear sides which are represented by the following equations:

For the side 21: $x=0.309+0.191w$

For the side 22: $x=0.309-0.309w$ \hspace{1em} (11)

The maximum error arising from the quadratic term of the distribution function of radiant flux appears near a $w$ of 0.22 and 0.78 and the value is given by $$E_{2-2}\max.=1.17\times10^{-3}a_2 \quad (12)$$

In addition, the maximum error arising from the fourth power term appears near a $w$ of 0.60 and the value is given by $$E_{2-4}\max.=2.06\times10^{-3}a_4 \quad (13)$$

Although the window shape of this approximate rectilinear photometric comb having two windows is a scalene triangle, it can be manufactured easily as the sides are straight, and yet its photometric accuracy is comparable to that of the conventional photometric comb having four windows in the form of an isosceles triangle.

With respect to the ideal photometric comb having three windows as shown in FIG. 4 also the shape of the approximate rectilinear window may be determined in like manner as described above. In this case, points of intersection of the sides 16 and 17 and of the sides 17 and 14 are free to be selected and they are so selected that the error arising from the second and fourth power terms is minimized as a whole. It has been found from calculation that photometric error is minimized when the sides 16, 17 and 14 are approximated by lines represented by the following formulae, respectively:

For the side 16: $x=0.401+0.99w$
For the side 17: $x=0.401-0.1785w$ \hspace{1em} (14)
For the side 14: $x=0.2225w$ In this case, maximum error arising from the quadratic term of the distribution function of radiant flux appears near $w$ of 0.22 and 0.78 and the value is given by $$E_{3-2}\max.=5.6\times10^{-4}a_2 \quad (15)$$

and maximum error arising from the term of fourth power appears near a $w$ of 0.22 and 0.80 and the value is given by $$E_{3-4}\max.=1.7\times10^{-4}a_4 \quad (16)$$

Maximum error arising from the sixth power term appears near a $w$ of 0.66 and the value is given by $$E_{3-6}\max.=1.4\times10^{-4}a_4 \quad (17)$$

As a conclusion, a photometric comb having approximate rectilinear windows in which the rectilinear sides are represented by Formulae 14 is comparable in photometric accuracy to the conventional photometric comb having about eight windows in the form of an isosceles triangle.

Similarly, an approximate rectilinear window may be determined corresponding to an ideal photometric comb having more than four windows.

These photometric combs having approximate rectilinear windows differ apparently from the conventional one having isosceles triangle windows in that the windows are not of similar shapes to each other and have progressively larger areas toward the axis of the comb and that all windows except the central one in a comb having an odd number of windows take the form of a scalene triangle.

In effect, the photometric comb according to the invention is comparable in photometric accuracy to the conventional photometric comb having a larger number of isosceles triangle windows and yet highly accurate photometric combs are easily produced.

Figure 2:
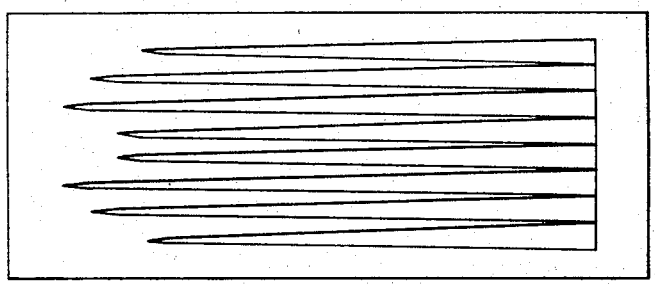

Although some of the fundamental forms of ideal and approximate rectilinear photometric combs have been described above, other modifications can be made, if necessary, by reducing the number of windows for low transmittance zone similarly to modification of window shapes from FIG. 1 to FIG. 2 in the conventional photometric comb having isosceles triangle windows. Furthermore, in the aforementioned explanation, an approximate rectilinear comb in which a straight line is substituted for each of the curved sides of an ideal photometric comb was described, but, if desired, for each side of an ideal photometric comb partial approximation may be made using some segments of line to form each side of a broken line. The quality of such approximate broken line photometric combs will fall between those of ideal one and approximate rectilinear one.

What we claim is:

A photometric comb having at least two light passing windows adapted to be inserted normal to a light beam having rectilinear cross section of illumination, characterized in (I) that the total sum of widths of the windows at any position is proportional to the distance from said position to a position where the windows vanish, (II) that the shape of the photometric comb is symmetric with respect to the longitudinal axis of the photometric comb, and (III) that said windows are curvilinear triangles of different shape and have progressively larger areas toward said axis, said triangles having bases extending in directions generally laterally of the axis and sides extending in directions having major components axially of the comb, the sides of said windows other than the bases being convex toward the outside of said photometric comb and the curvatures thereof being such that when the distribution function of the radiant flux is expanded into a power series, the photometric error arising from the lower power terms of said power series amounts to zero.

References Cited
UNITED STATES PATENTS
3,013,470  12/1961  Pliskin _____ 88—61

JEWELL H. PEDERSEN, *Primary Examiner.*

W. L. SIKES, *Examiner.*